E. WESTON.
Dynamo Electric Machine.

No. 233,823.    Patented Oct. 26, 1880.

Witnesses:
Geo. W. Miatt
E. H. Williams

Inventor:
Edward Weston
Per Edw. E. Quimby
Atty.

E. WESTON.
Dynamo Electric Machine.

No. 233,823. Patented Oct. 26, 1880.

Witnesses:
Geo. W. Miatt
E. H. Williams

Inventor:
Edward Weston
Per Edw. E. Quimby
Atty.

E. WESTON.
Dynamo Electric Machine.

No. 233,823. Patented Oct. 26, 1880.

Witnesses:
Geo. H. Miatt
E. H. Williams

Inventor:
Edward Weston
Per Edw. E. Quimby
Atty.

4 Sheets—Sheet 4.

E. WESTON.
Dynamo Electric Machine.

No. 233,823.    Patented Oct. 26, 1880.

Witnesses:
Geo. W. Miatt
E. B. Williams

Inventor:
Edward Weston
Per Edw. E. Quimby
Atty.

UNITED STATES PATENT OFFICE.

EDWARD WESTON, OF NEWARK, NEW JERSEY, ASSIGNOR TO WESTON DYNAMO ELECTRIC MACHINE COMPANY, OF SAME PLACE.

DYNAMO-ELECTRIC MACHINE.

SPECIFICATION forming part of Letters Patent No. 233,823, dated October 26, 1880.

Application filed December 13, 1877. Patented in England December 14, 1877.

*To all whom it may concern:*

Be it known that I, EDWARD WESTON, of Newark, New Jersey, have invented certain Improvements in Dynamo-Electric Machines, of which the following is a specification.

My improvements relate to the kind of dynamo-electric machine for which Letters Patent of the United States No. 180,082 were granted to me the 18th day of July, 1876, the distinguishing characteristic of such machine being that a series of electro magnets or armatures radially affixed upon a shaft is adapted to rotate in the central space within a series of stationary electro-magnets affixed to a ring or cylinder, and projecting convergently therefrom in the same plane with and toward the axis of the revolving armatures, the coils upon all the magnets, both stationary and movable, being included in the same circuit, so that the entire current induced in the revolving armatures flows through the coils upon all the stationary magnets.

My present invention, in addition to embracing certain organic improvements in the construction of the machine referred to, also embraces a peculiarly-constructed mechanical circuit closer and breaker, and certain combinations thereof with the machine and with a differential circuit containing a resistance-coil.

Figure 1:
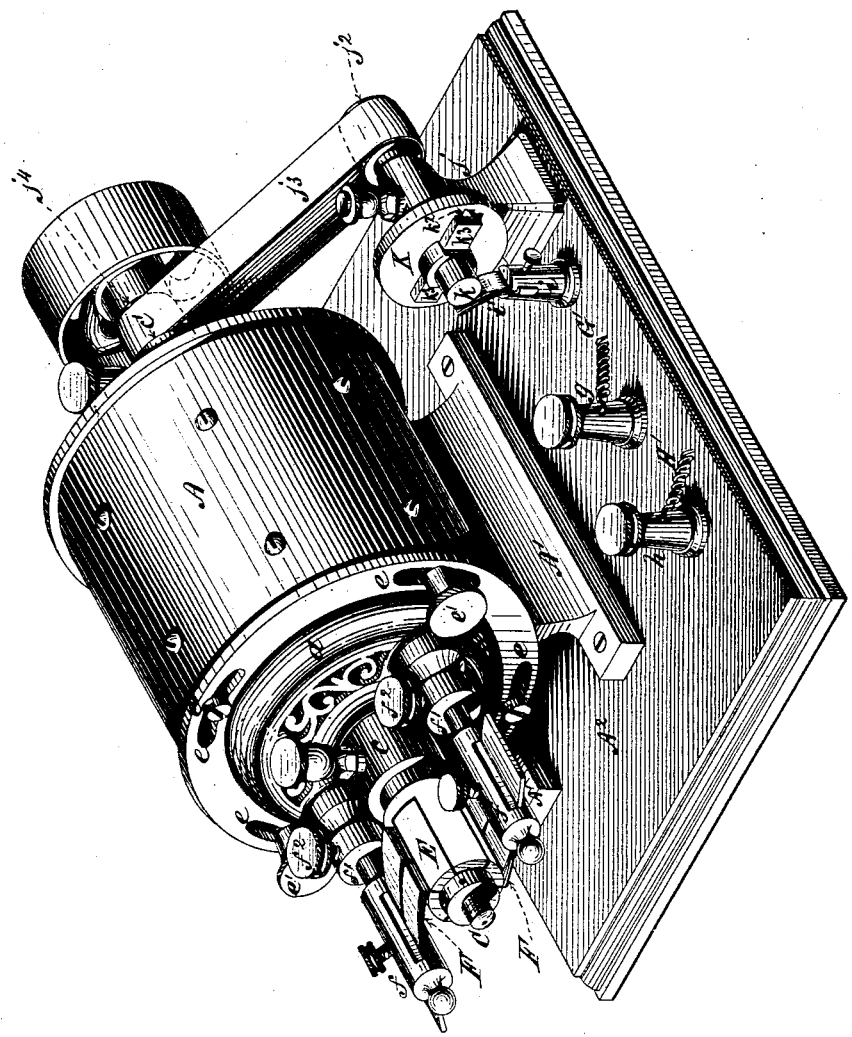
Figure 2:
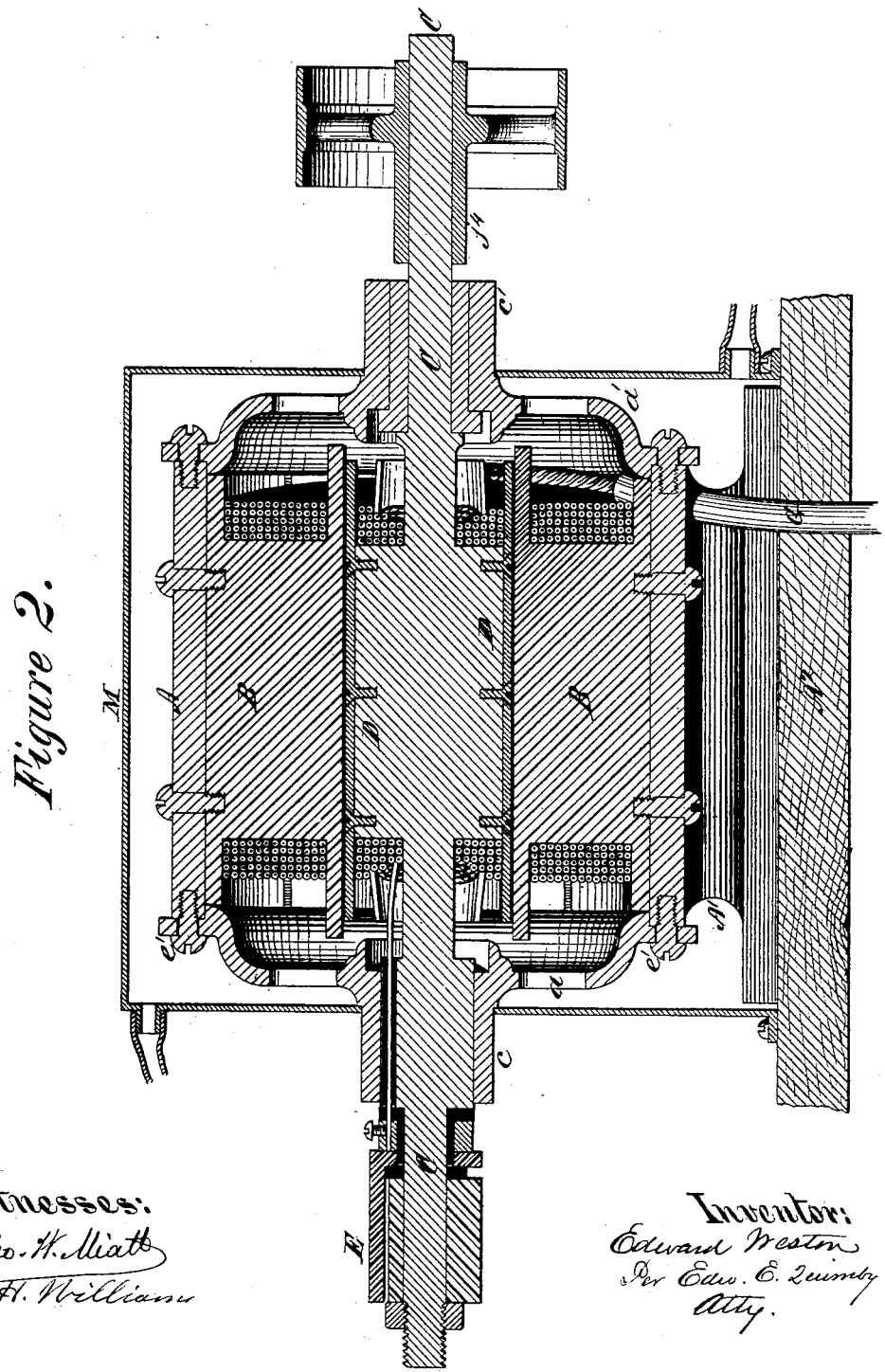
Figure 3:
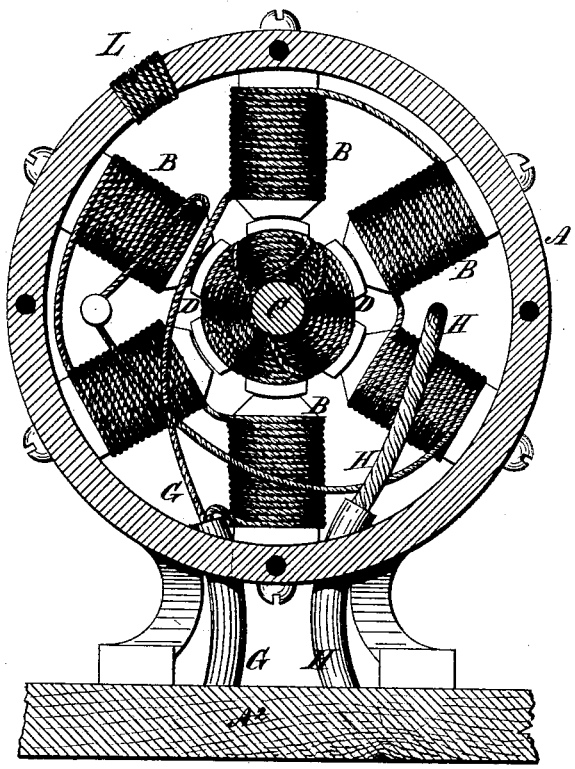
Figure 4:
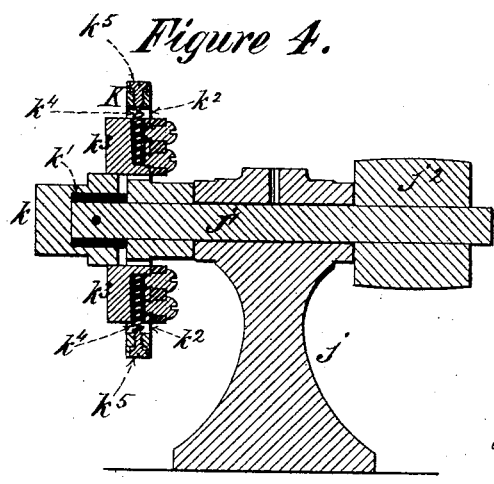
Figure 5:
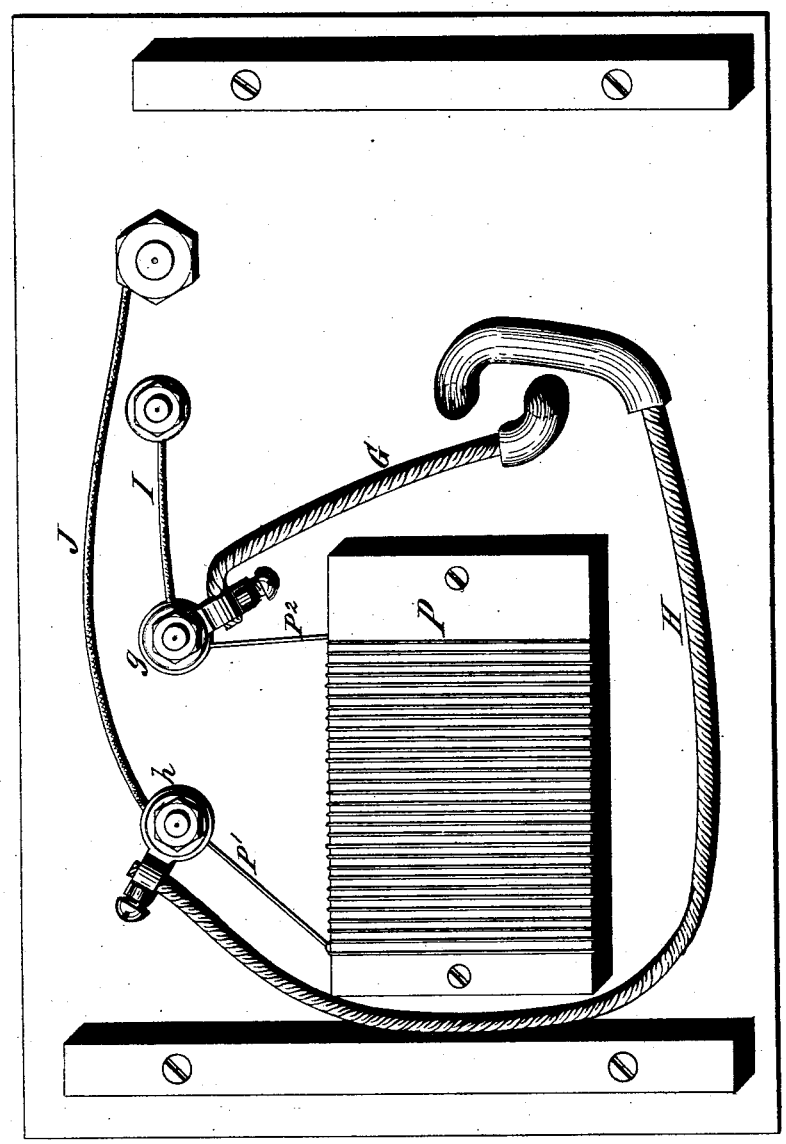

The accompanying drawings, illustrating a dynamo-electro machine of the kind referred to, containing my present improvements, are as follows, viz:

Figure 1 is an isometrical perspective of the machine provided with my mechanical circuit closer and breaker. Fig. 2 is a central vertical longitudinal section of the machine. Fig. 3 is a transverse vertical section through the line $xx$ on Fig. 2. Fig. 4 is a central vertical longitudinal section through the circuit closer and breaker. Fig. 5 is a view of the under side of the bed-plate of the machine, showing the wires connecting the machine with the feet of the binding-posts, also showing the differential circuit containing the resistance-coil and the wires connecting the binding-posts with the circuit closer and breaker.

The machine consists of a hollow cast-iron cylinder, A, which is provided with a foot-piece, A', by means of which it is bolted to a substantial bed-plate, $A^2$. A number of electro-magnets, B, are equidistantly affixed to the inner surface of the cylinder and project therefrom convergently toward the axis of the cylinder. The cylinder is provided with heads $a$ and $a'$, which are centrally perforated to afford bearings for the driving-shaft C, to which another series of electro-magnets or armatures, D, is radially affixed. The electro-magnets are long and narrow, and are affixed lengthwise to the shaft and to the cylinder, respectively. In this respect, and in respect to the inclusion of the coils upon all the electro-magnets in a single circuit, the machine is like that shown and described in Letters Patent of the United States No. 180,082.

One of my present improvements consists in making the armatures and the shaft C of one piece of iron, which greatly lessens the cost of the structure.

By providing removable caps or top plates for the outer ends of the armature-cores I am enabled to remove the coils therefrom bodily, and I am also enabled to wind the coils upon another instrumentality and place them bodily upon the armature-cores, where they may be secured by the caps upon the outer ends of the cores, or by rings, or by wires or straps wrapped around the periphery of the system of revolving armatures after the coils are in place.

Another improvement consists in mounting the shaft C in journals $c$ and $c'$, which are formed in bosses cast on the heads $a$ and $a'$. The head $a'$ is permanently bolted to the end of the cylinder, but the head $a$ is secured to the opposite end of the cylinder by bolts passing through the concentrically-slotted bolt-holes $e$, and is therefore capable of rotatory adjustment within fixed limits.

It will be seen that each of the brushes F is secured to a longitudinally-slotted stem, $f$, the end of which is inserted in a hollow boss, $f'$, which is cast on the face of the head $a$, the inserted portion of the stem $f$ being held in position by means of a set-screw, $f^2$.

The commutator E is in two parts, and is like that shown in the Patent No. 180,082, and is secured upon that portion of the shaft C which projects beyond the journal $c$ on the head $a$.

As both of the brushes F are affixed to the head $a$, they are simultaneously adjustable, and I so regulate the length and position of the concentric slots $e$ as to limit the range of motion of the head $a$, and therefore of the brushes, to the space between the respective two positions which the brushes occupy when the machine is employed to generate an extremely weak current on the one hand and the strongest possible current on the other hand.

Inasmuch as an excessive movement of the brushes would have the effect of reversing the direction of the current through the coils on the stationary magnets, it will be seen that the slots $e$ perform an important function in guarding against an improper or careless adjustment of the brushes. It will also be seen that the operator, by observing the relative position of the slots $e$ with reference to the screw-bolts $e'$, which pass through them, is afforded a means of readily making the current generated by the machine either stronger or weaker by moving the adjustable head $a$ in one direction or the other, as the case may be.

By mounting the commutator on the projecting end of the shaft C, and by supporting the brushes as described, the freest possible access is afforded to the commutator, both for the purpose of attaching or detaching it from the shaft and also for the purpose of observation in effecting the adjustment of the brushes.

By making the journals for the shafts C parts, respectively, of the heads $a$ and $a'$, I obtain rigid bearings for the shaft, which are incapable of vibration or of changing their axial position with respect to the cylinder.

I make my brushes of a suitable number of thin sheets of copper, which are silver-plated, the object of the plating being to keep the sheets clean and protect them against corrosion, which might impair the integrity of their electrical contact with each other and with the periphery of the commutator.

The current collected from the commutator by one of the brushes is transmitted to the coils surrounding the stationary electro-magnets, and thence, by means of the connecting-wire G, to the lower end of the binding-post $g$, to the upper end of which is secured the end of one of the wires G' of the main or operative circuit. The current collected by the other brush is conducted by means of the wire H to the lower end of the other binding-post $h$, to the upper end of which is secured the end of the other main-circuit wire, H'.

The two binding-posts are connected, respectively, by means of the wires I and J, (shown in Fig. 5,) to the lower ends of the standards $i$ and $j$, which support the two parts of my mechanical circuit closer and breaker. This instrumentality consists of a radially-slotted disk, K, affixed to the shaft $j'$, having its bearing in a journal formed at the upper end of the standard $j$, and carrying on the end opposite the disk the pulley $j^2$, for the reception of a belt, $j^3$, which may be driven by the pulley $j^4$ on the driving-shaft C of the machine, or otherwise by the power that drives the machine.

A brass hub, $k$, is mounted upon the end of the shaft $j'$, in front of the disk K, and is insulated from the shaft by means of the bushing $k'$, composed of wood or some other insulating material. The two radial slots in the disk K each contain a sliding block, $k^3$, which, when the disk is at rest, are maintained in electrical contact with opposite sides of the hub $k$ by means of the adjustable spiral springs $k^4$, coiled upon the screws $k^5$, which are radially inserted through those portions of the periphery of the disk K which form, respectively, the outer shells of the slots.

The standard $i$ is provided at its upper end with the flexible brush $i'$, which bears upon the outer portion of the periphery of the hub $k$, and maintains a constant electrical contact therewith. When, therefore, the machine is at rest the binding-posts are electrically connected with each other by means of the connecting-wires I and J and the mechanical circuit closer and breaker. For convenience I call this connection a bridge, and it will be seen that my mechanical circuit closer and breaker occupies to this bridge the relation of a draw or cut-off. So long as the draw is closed the current generated in the machine is provided with a short circuit across the bridge connecting the two binding-posts; and, as will also be seen, if the operative circuit includes an electroplating-vat a reverse current resulting from the polarization of the electrodes in the vat will also be provided, with a short circuit across the bridge connecting the two binding-posts. Under such circumstances, owing to the small resistance of the short circuit, as compared with that portion of the main circuit embodied in the coils surrounding the magnets in the machine, almost the entire reverse current will take the short circuit across the bridge, and no sufficient portion of it to effect the polarity of the magnets will pass through the machine. When, however, the machine having been set in motion, has acquired a predetermined speed of rotation, the corresponding rotation of the disk K causes the switch-blocks $k^3$ to detach themselves from contact with the hub $k$ and move radially outward in the slots in which they are contained, compressing the spiral springs $k^4$. In this condition the bridge is broken, the draw is open, and the current generated by the machine is all maintained upon the operative circuit, excepting such portion of it as may be diverted therefrom into the differential circuit composed of the resistance-coil P and its connections P' and P² with the binding-posts.

In another application I have described and claimed the combination of the differential circuit containing the resistance-coil with the main circuit and a circuit closer and breaker adapted to open and close the main circuit. In the present case it will be seen that the circuit closer and breaker does not act upon the main circuit, but only upon the bridge connecting the wires of the main circuit. When the bridge is closed it affords a short circuit both for the machine-current and for any reverse current from the electrodes with which the wires of the main circuit are connected. In this case the resistance-coil P and its connecting-wires P' and P² provide a circuit for the machine, which is constantly closed, and which, therefore, affords a path for the current generated in the machine when the bridge is broken by the rotation of the disk K and when the main circuit is broken from any other cause, as, for example, the removal of objects from the plating-vat.

In the mechanical circuit closer and breaker which I have heretofore used the electrical continuity of the several parts was established or interrupted, as the case might be, according to the preponderating influence of gravity in the one case or to the preponderating influence of centrifugal force in the other case.

In my present device it will be seen that the electrical continuity of the parts composing the circuit closer and breaker is established whenever the force of the spiral springs in the rotating disk K is sufficient to hold the switch-blocks in contact with the hub $k$, and that the electrical continuity is interrupted by the preponderating action upon the switch-blocks of the centrifugal forces generated by the rapid rotation of the disk which carries them.

One of the advantages of so organizing the machine as to have the stationary magnets and the armatures contained within a cylinder is that solid heads may be affixed to the ends of the cylinder by water-tight joints, and a circulation of cold water may be maintained through the interior of the cylinder by means of an induction-pipe at the bottom and an eduction-pipe at the top. In such case a water-tight plate would be introduced between the end of the cylinder and the head $a$, upon which the brushes are supported.

It may sometimes be desirable to extend the coils by winding them lengthwise around the shell of the cylinder between the stationary electro-magnets, as shown at L, Fig. 3. In that case the cylindrical shell M, Fig. 2, may be used for the purpose of establishing a water-tight chamber in which the cylinder can be contained.

If the machine is to be worked in water the immersed parts must be coated with an insulating material. This may be effected by dipping them in melted paraffine.

Certain of the features which are embraced in this specification are described and shown in my British Letters Patent No. 4,748 of 1877.

I claim as my invention—

1. In a dynamo-electric machine, brushes for collecting currents of electricity from a rotating commutator deriving their support from a disk mounted upon an axis coinciding with the axis of the commutator, and having a range of adjustment limited to the width of one of the commutator-strips, and adapted to vary the position of the brushes upon the commutator relatively to the magnetic field from the minimum point of magnetic induction to the maximum point, substantially as described.

2. The cylinder-head $a$, supporting the brushes F F, provided with the concentric slots $e$, of the same length in degrees of the circle as the arc described by one of the strips of the commutator, for the purpose of limiting the range of adjustment of the brushes to the distance between the minimum and maximum points of magnetic induction, substantially as described.

3. The brushes F F, composed of silver-plated copper sheets, substantially as and for the purpose set forth.

4. The rotating disk K, operated by a mechanical connection with a dynamo-electric machine or with the driving-power thereof, and provided with the radial slots $k^2$, each containing a sliding block, $k^3$, and an adjustable spiral spring, $k^4$, in combination with the insulated hub $k$, the brush $i'$, and the standard $i$, the whole being arranged in circuit with the dynamo-electric machine, substantially in the manner described, and operating as and for the purposes set forth.

5. The main or operative circuit of a dynamo-electric machine, in combination with a bridge containing an automatic switch or circuit closer and breaker, and a derived circuit or shunt around said switch containing a resistance-coil, substantially as described.

6. In a dynamo-electric machine, an armature and stationary electro-magnets coated with paraffine or some other insulating material, in combination with a water-chamber, substantially as and for the purpose set forth.

EDWARD WESTON.

Witnesses:
M. L. ADAMS,
EDWD. PAYSON.